United States Patent [19]
Tsiklauri et al.

[11] Patent Number: 5,457,721
[45] Date of Patent: Oct. 10, 1995

[54] METHOD AND APPARATUS FOR IMPROVING THE PERFORMANCE OF A NUCLEAR POWER ELECTRICAL GENERATION SYSTEM

[75] Inventors: Georgi V. Tsiklauri, Richland; Bruce M. Durst, Kennewick, Wash.

[73] Assignee: Battelle Memorial Institute, Richland, Wash.

[21] Appl. No.: 249,786

[22] Filed: May 25, 1994

[51] Int. Cl.$^6$ .................................................. G21D 1/00
[52] U.S. Cl. ........................... 376/317; 60/644.1; 60/653; 376/402
[58] Field of Search .................................. 376/317, 378, 376/391, 402; 60/644.1, 648, 653

[56] References Cited

U.S. PATENT DOCUMENTS

| | | | |
|---|---|---|---|
| 3,575,002 | 4/1971 | Vuia ........................................... | 376/317 |
| 4,031,706 | 6/1977 | Vakil et al. ............................... | 376/317 |
| 4,336,105 | 6/1982 | Silvestri, Jr. ............................. | 376/317 |

OTHER PUBLICATIONS

"Gas Turbines for Superheat in a Nuclear Power Plant", Proceedings of the American Power Conf., vol. 32, 1970, pp. 404–411.

*Primary Examiner*—Daniel D. Wasil
*Attorney, Agent, or Firm*—Johnnie R. Hynson

[57] ABSTRACT

A method and apparatus for improving the efficiency and performance a of nuclear electrical generation system that comprises the addition of steam handling equipment to an existing plant that results in a surprising increase in plant performance. More particularly, a gas turbine electrical generation system with heat recovery boiler is installed along with a high pressure and a low pressure mixer superheater. Depending upon plant characteristics, the existing moisture separator reheater (MSR) can be either augmented or done away with. The instant invention enables a reduction in $T_{hot}$ without a derating of the reactor unit, and improves efficiency of the plant's electrical conversion cycle. Coupled with this advantage is a possible extension of the plant's fuel cycle length due to an increased electrical conversion efficiency. The reduction in $T_{hot}$ further allows for a surprising extension of steam generator life. An additional advantage is the reduction in erosion/corrosion of secondary system components including turbine blades and diaphragms. The gas turbine generator used in the instant invention can also replace or augment existing peak or emergency power needs.

17 Claims, 8 Drawing Sheets

5,457,721

METHOD AND APPARATUS FOR IMPROVING THE PERFORMANCE OF A NUCLEAR POWER ELECTRICAL GENERATION SYSTEM

FIELD OF THE INVENTION

The present invention relates generally to improving the efficiency, reliability, safety and other operational characteristics of nuclear electrical power plants with a light water reactor. And more particularly to mixing superheated steam from a heat recovery boiler of a gas turbine combined cycle steam system with main steam at the HP stage and the LP stage of the main turbine.

BACKGROUND OF THE INVENTION

In the operation of nuclear power plants, there are several important problems that significantly increase the cost of operations and maintenance. Some of these significant problems are: inherently low thermal efficiency, erosion-corrosion fuel storage and waste disposal limitations, equipment maintainability and reliability concerns as well as the limited fuel availability and the expensive requirements of storing spent fuel.

Various approaches have been tried to solve these problems separately, but few of the existing methods attack more than one of these concerns at a time.

Currently, in nuclear power plants (both pressurized water reactors or boiling water reactors), steam at the inlet of the turbine is saturated. This results in lower turbine efficiency and intensive erosion-corrosion problems.

SUMMARY OF THE INVENTION

It is therefore an object of this invention to provide a means to improve the efficiency, availability, safety and economy of nuclear power generation systems. And more particularly an improved means for providing superheated steam to the steam turbine driving the electrical generator.

It is a more particular object of the invention to allow for lower hot leg temperatures ($T_{hot}$) in the primary cycle of an existing nuclear power plant. The lower $T_{hot}$ would reduce the rate of erosion-corrosion and extend the lifetime of PWR steam generators.

It is a further object of the invention to extend plant life by enabling the delivery of the same amount of electricity for a smaller amount of heat generated by nuclear reaction. In other words, the invention is a combined nuclear-gas turbine cycle that can be used to, inter alia, reduce corrosion damage to the nuclear steam generator by operating the outlet reactor hot leg temperature below the critical corrosion temperature. Corrosion is significantly reduced by operating steam generators at less than 600° F. With the instant invention nuclear power plants can operate below 600° F. without derating the electrical output of the station. The advantage of reduced corrosion is due to reduced steam generator temperature caused by an increased thermal efficiency of the resulting steam cycle.

One factor that causes an increase in efficiency is that the additional electrical output from the gas turbines further adds to the electrical grid output of the station. In the instance where the hot leg temperature is reduced below the critical steam generator corrosion temperature, the thermal power of the reactor will be lower, resulting in a potentially longer operating cycle time between reactor refueling cycles.

This enables a longer period between refueling which is getting progressively more expensive. The disposal of spent nuclear fuel and waste, which is now a major concern of nuclear industry, will be reduced significantly.

In addition, lower reactor power avails opportunities to perform maintenance on many key apparatuses in the secondary system (the steam cycle in PWRs and the coolant cycle in BWRs) while the reactor is at power. By reducing corrosion and erosion the down time is decreased thus enabling the plant to operate with less down time. It is well known in the art that the fuel replacement cost during downtime is from several hundreds of thousands of dollars to one million dollars, depending upon the plant.

When the reactor is operating at a lower thermal power, there are, in essence, built-in spare components with the arrangement of currently installed equipment.

To underscore the importance of erosion and corrosion in steam equipment it should be noted that maintenance of many secondary-side (i.e., steam handling) components are often the source of unplanned outages.

In the instant invention, the steam turbine has higher efficiency and reduced erosion-corrosion. The reactor steam, prior to entering the high pressure stage of the main turbine, is superheated by a high-pressure-mixer-superheater (HPMS) that utilizes the highly superheated steam from the heat recovery boiler (HRB) of the gas turbine combined cycle. The steam is then conditioned, according to need, by several different components.

In the most commonly used application to improve the efficiency of an operating nuclear power plant the steam would next go to the moisture separator reheater (MSR), that is a common component of existing plants. The MSR can be bypassed depending upon the existing steam quality from the high pressure (HP) stage of the main turbine. The steam is next improved for use by the low pressure (LP) stage of the main turbine. This is done is a low pressure mixer superheater which mixes steam from the MSR (when used) with HRB steam. The instant invention has a marked increase in the portion of the LP stage of the main turbine that is driven by superheated steam. This enables a reduction in corrosion and erosion.

The invention also provides an additional avenue to make nuclear stations safer due to the addition of an operating source of alternative emergency power (i.e., the gas turbines). Additionally, the size of the gas turbine and generator is not limited and the instant invention therefore readily lends itself to operation in conjunction with a large gas turbine and generator that could function as an independent source of power during peak times or alone to supply a grid.

BRIEF DESCRIPTION OF THE DRAWINGS

FIG. 5: Is schematic representation of the flow path in a

HRB used in a nuclear electric generation plant utilizing the instant invention.

Figure 6:
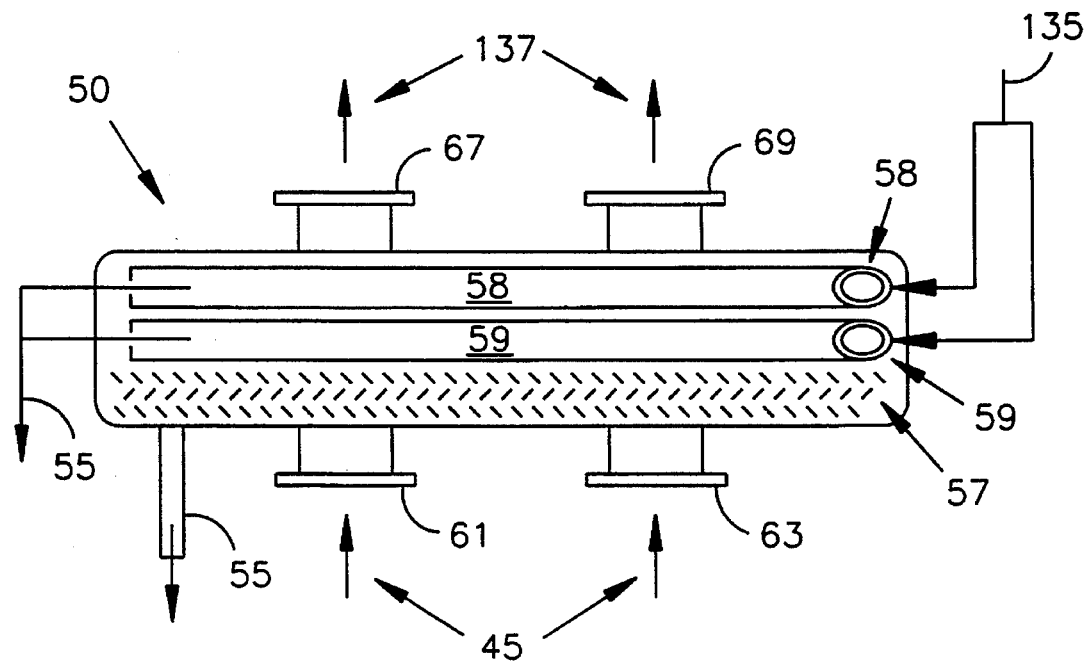

FIG. 6: Is sectional view of a schematic representation of the flow path in a MSR used in a nuclear electric generation plant utilizing the instant invention.

Figure 7:
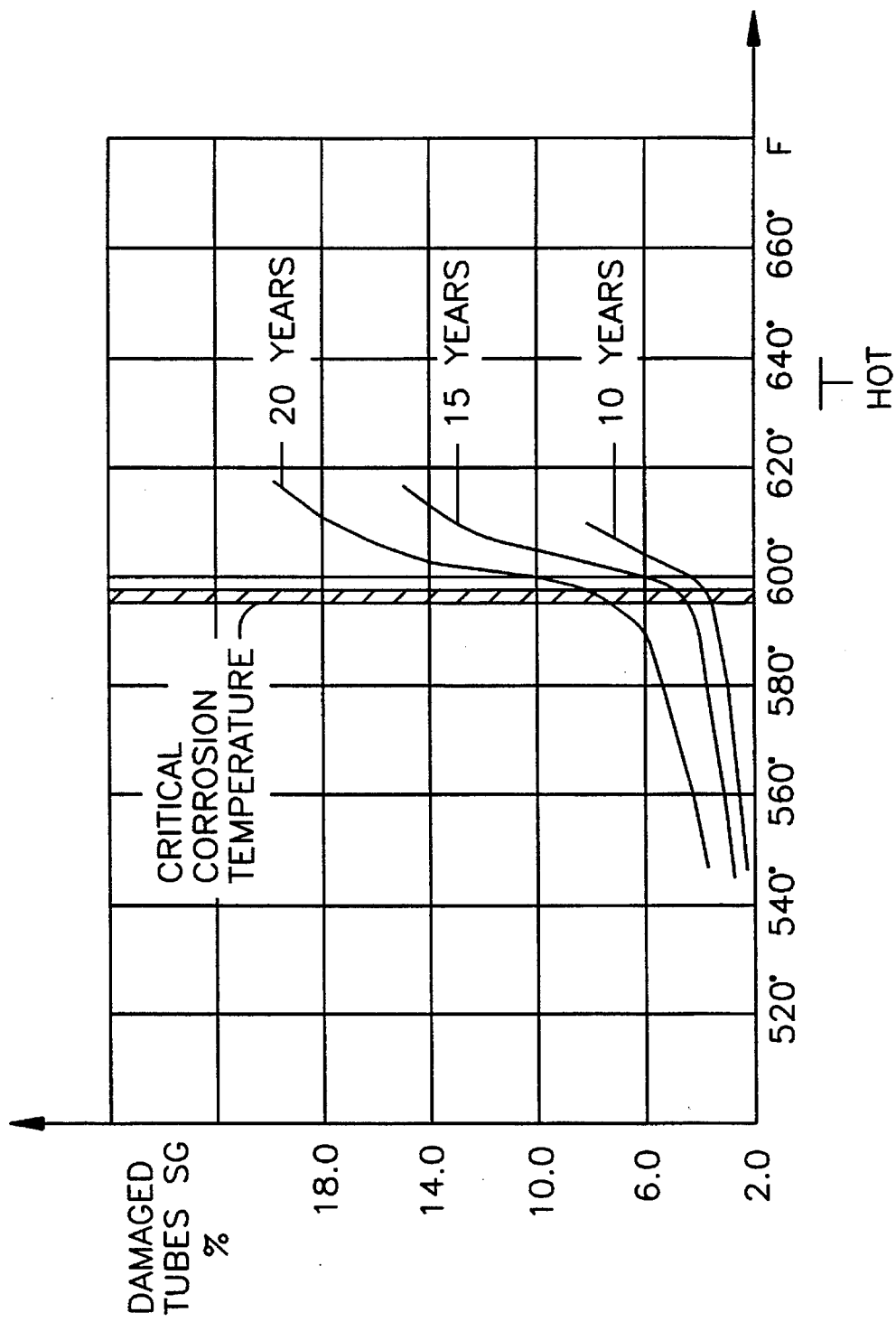

FIG. 7: Is a graph of the percentage of tubes plugged due to corrosion versus time in operation with various temperature curves being illustrated.

Figure 8A:
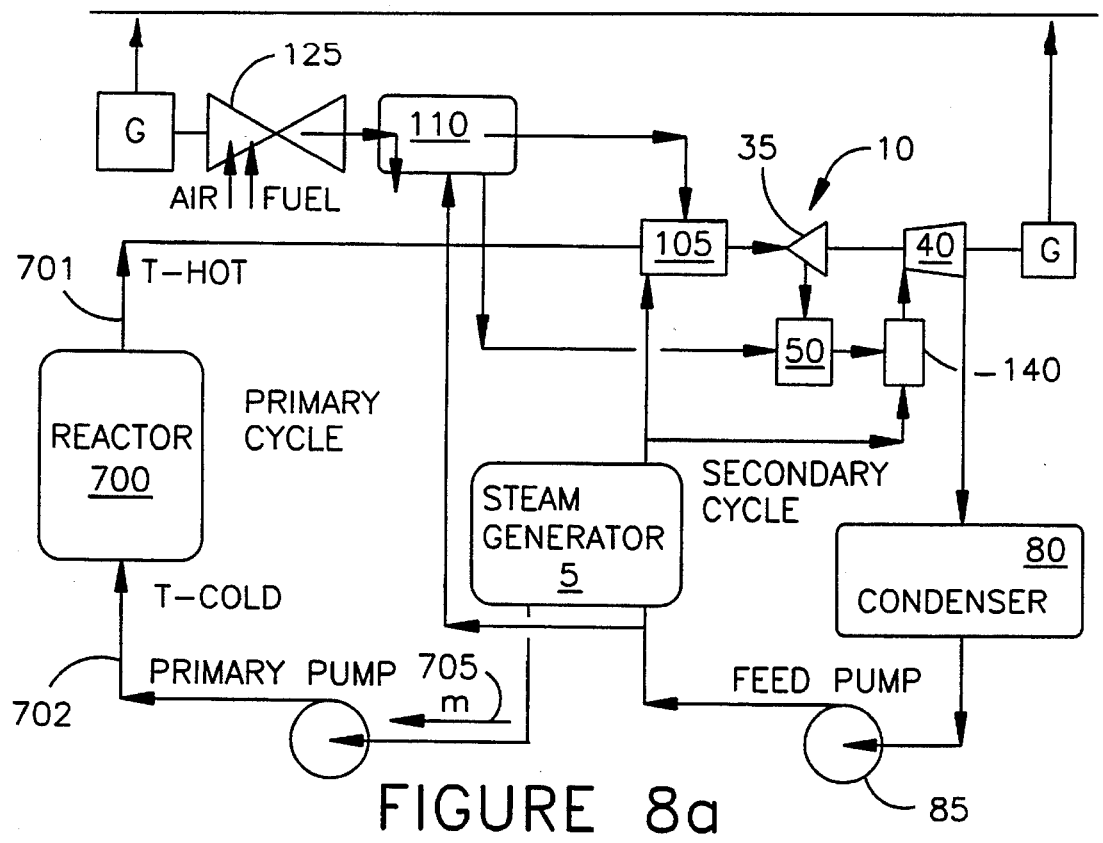

FIG. 8a: Is a schematic representation of the primary and second cycles of a pressurized water reactor electrical generation plant utilizing the instant invention.

Figure 8B:
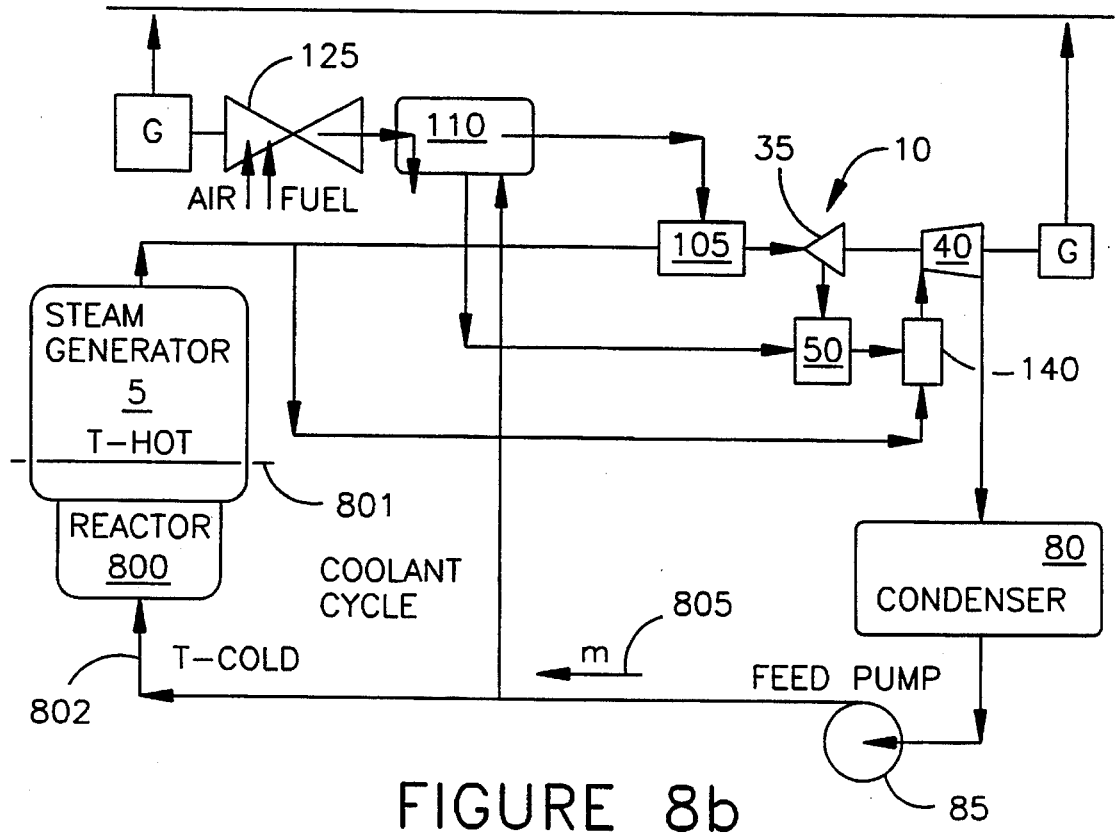

FIG. 8b: Is a schematic representation of the primary and second cycles of a boiling water reactor electrical generation plant utilizing the instant invention.

Figure 9A:
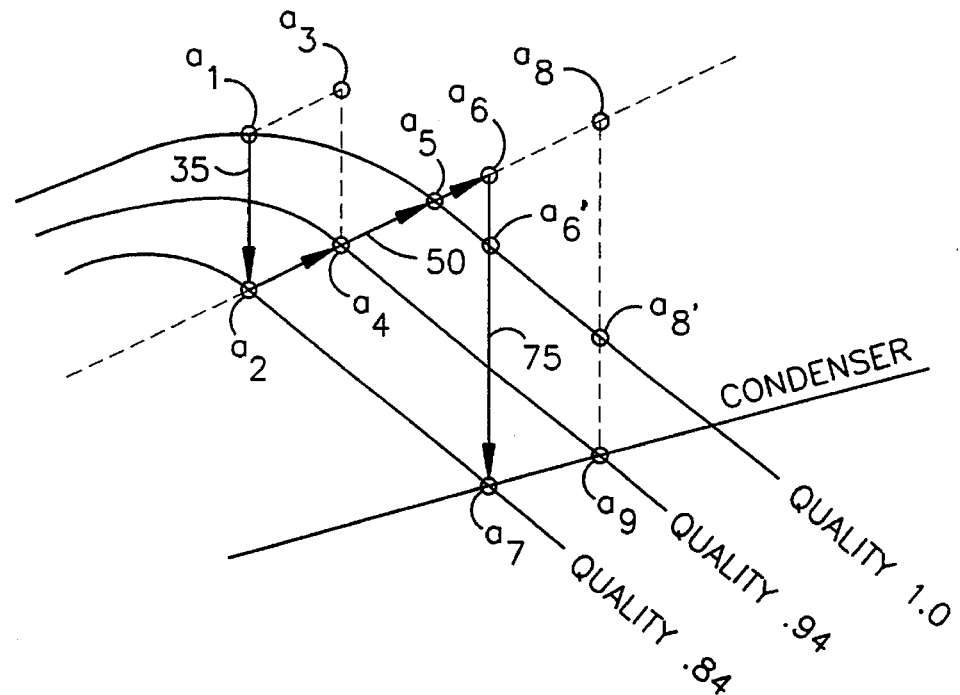

FIG. 9a: Is a portion of a Mollier diagram that represents the operation of a typical nuclear reactor electric generation plant.

Figure 9B:
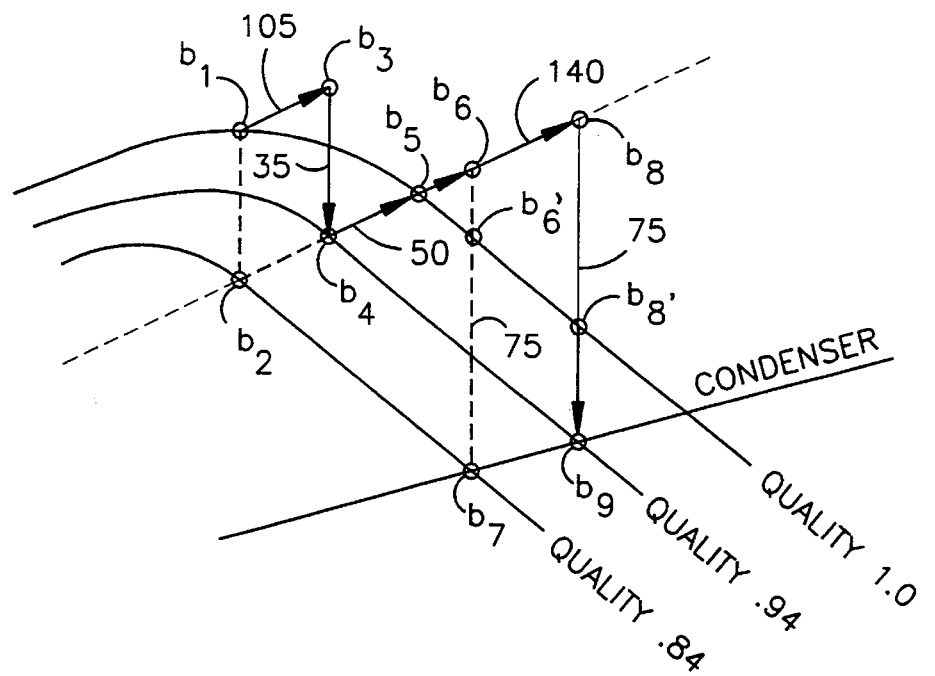

FIG. 9b: Is a portion of a Mollier diagram that represents the operation of a typical nuclear reactor electric generation plant utilizing the invention to improve performance.

Figure 10:
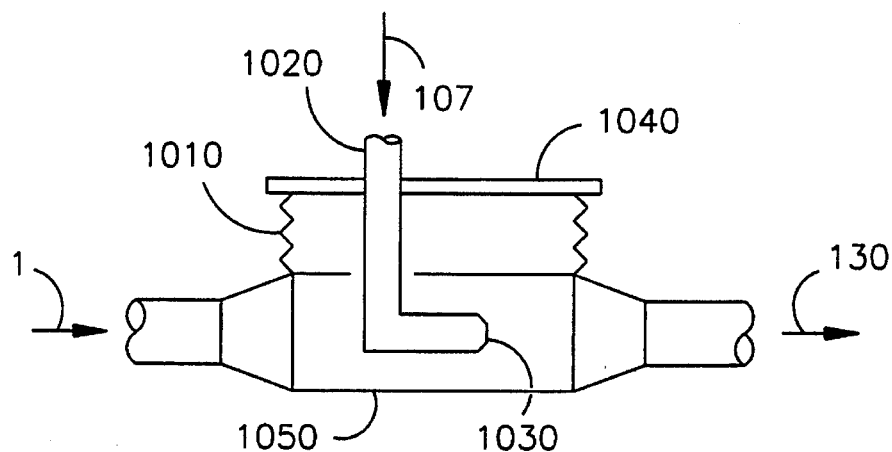

FIG. 10: Is a schematic sectional view of a tube steam mixer superheater jet chamber with a bellows arrangement.

Figure 11:
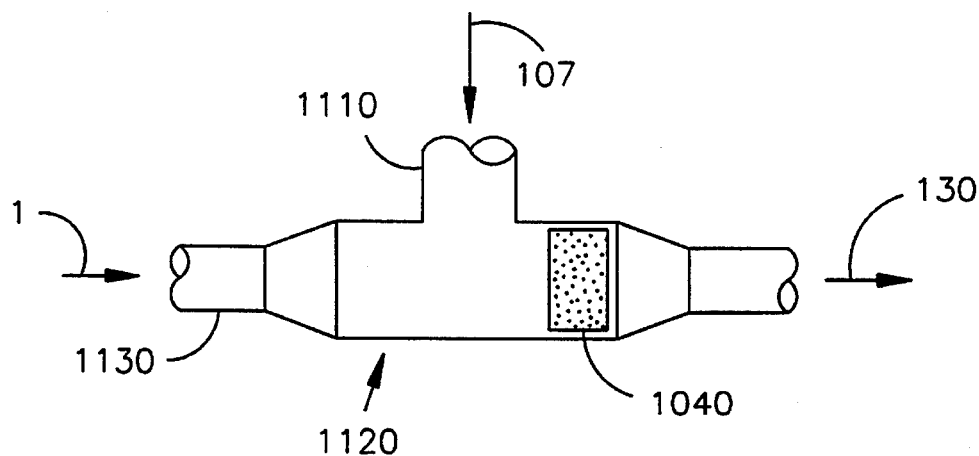

FIG. 11: Is a schematic sectional view of a piping tee with a honeycomb mixer section inserted.

Figure 12:
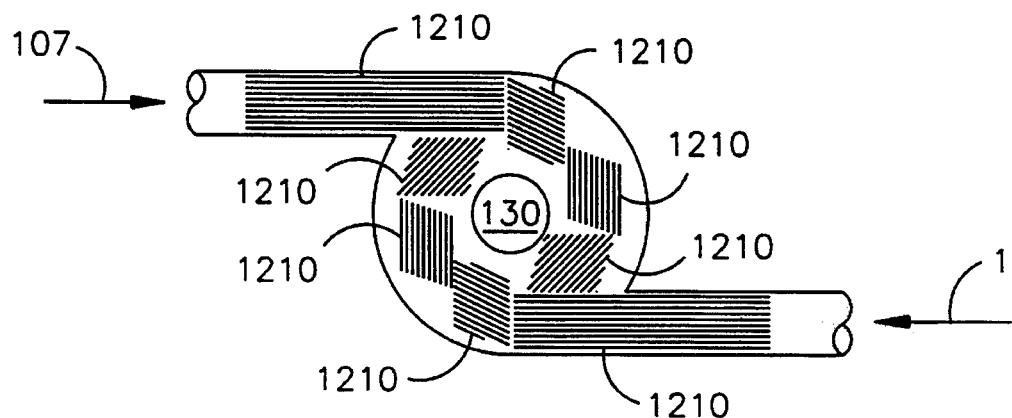

FIG. 12: Is a schematic sectional view of a vane-vortex steam mixer superheater arrangement.

Figure 13:
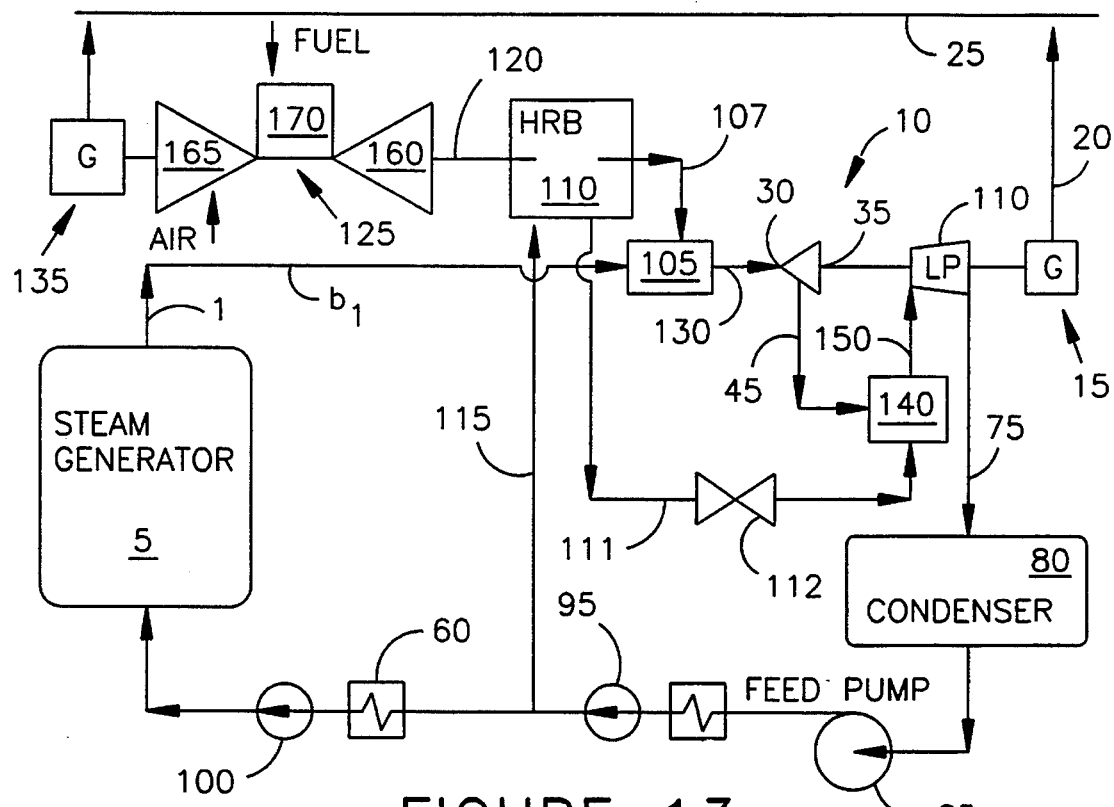

FIG. 13: Is a schematic representation of a typical nuclear reactor electric generation plant that has a heat recovery boiler that has only pressure steam output.

Figure 14:
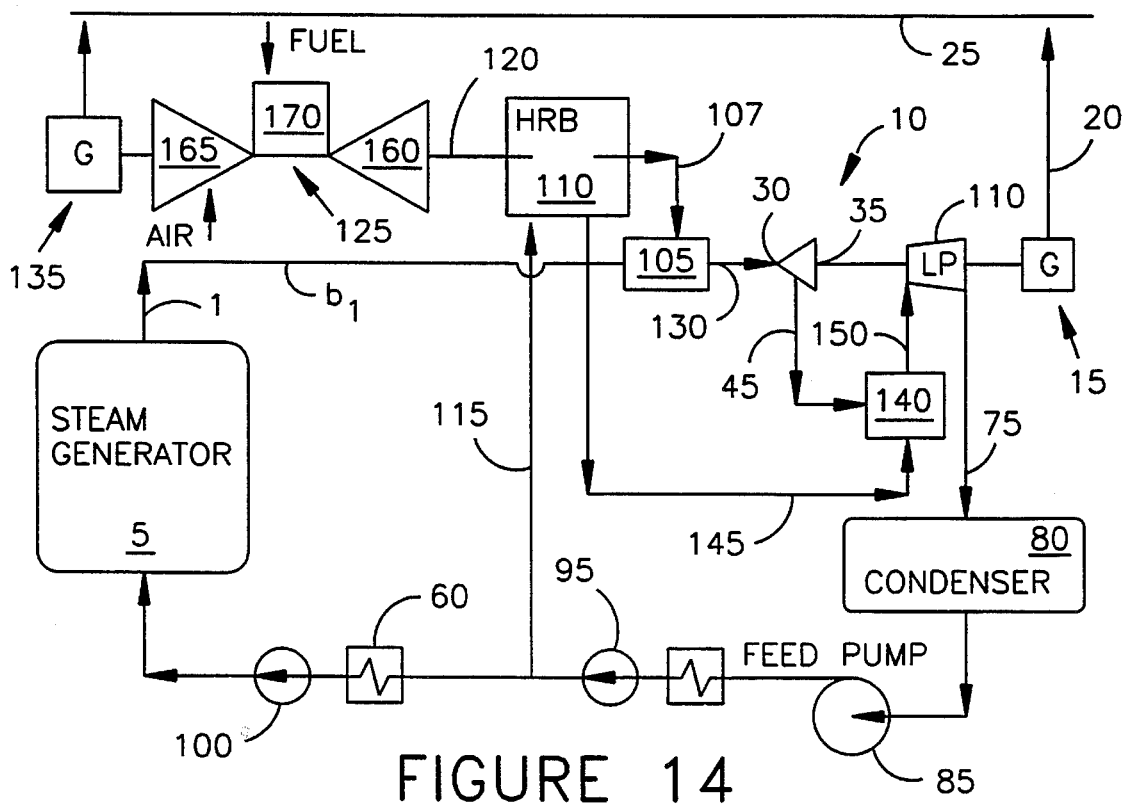

FIG. 14: Is a schematic representation of a typical nuclear reactor electric generation plant that has a heat recovery boiler that has only two steam pressure outputs and no moisture separator reheater.

DESCRIPTION OF THE PREFERRED EMBODIMENTS

Nuclear power electrical generation plants have a tremendous potential to produce energy. However, these plants have technical problems that prevent them from reaching their full energy production and from lasting to the end of their design lifetime. These include corrosion due to the high temperatures that they must operate at, and erosion of turbine and secondary system components to name a few. The instant invention enables the lowering of primary $T_{hot}$ temperature, steam generator temperature, and the increasing of steam quality that greatly reduces erosion of piping and components as well as turbine blades and diaphragms.

EXISTING STEAM PERFORMANCE

Figure 1:
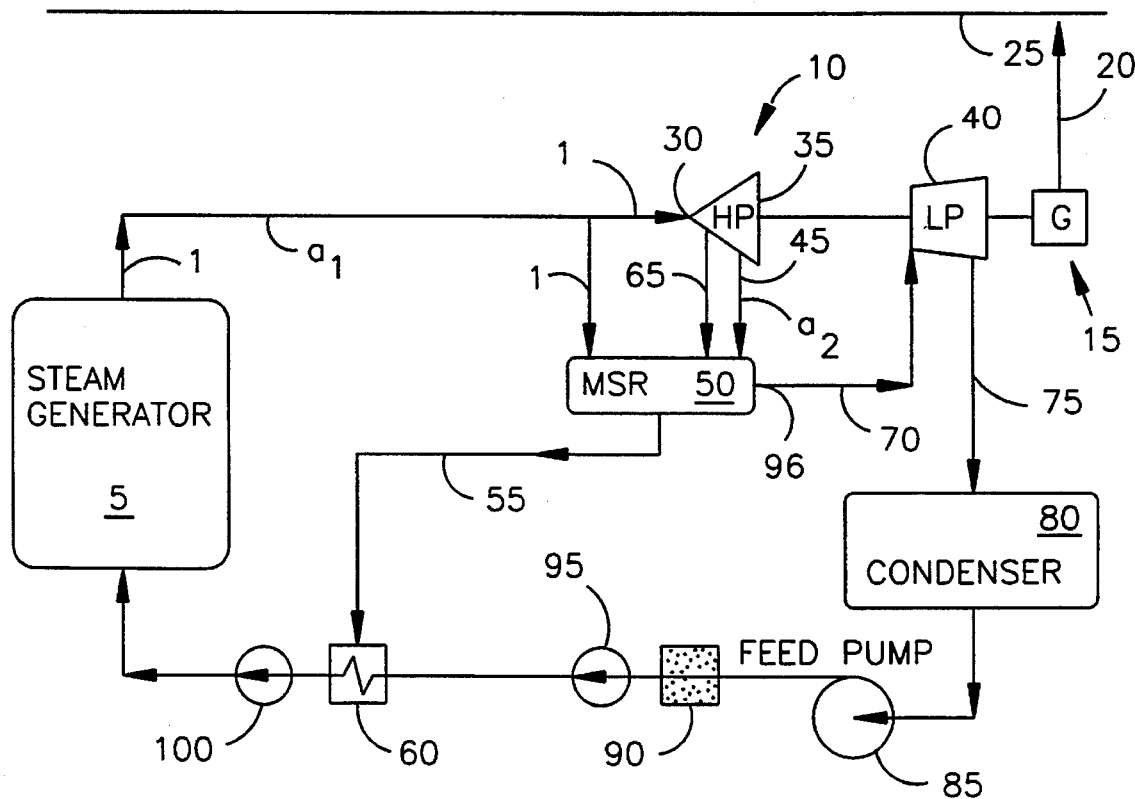
FIG. 1: Is a schematic representation of the steam cycle of a typical nuclear reactor electric generation plant.

Referring to FIG. 1, the typical nuclear power electric generation system that utilizes a light water reactor will typically operate with wet main steam 1. Wet main steam 1 for this type of system, including both pressurized water reactors and boiling water reactors, is typically supplied by a steam generator 5 to drive the main turbine 10 that is the mechanical force to operate an electrical generator 15. Electrical power generated 20 by these systems is supplied to a grid 25 that purchases the electrical power 20.

Wet main steam 1 arriving at the main turbine 10 produces moisture problems such as corrosion and erosion of the turbine blades and diaphragms that limit plant life and are extremely costly in down time, replacement, and operational limitations. Main steam 1 at the entrance 30 to the main turbine 10 will typically be from 0.2% in moisture and be from 970 to 1030 psig. The main turbine 10 typically consists of two stages, the high pressure (HP) 35 stage and the low stage (LP) Stage 40. After work is extracted from main steam 1 in the HP stage 35 the characteristics of the HP exhaust steam 45 must be enhanced to improve utilization of steam by the LP stage 40.

Currently, nearly all the nuclear power plant turbines, operating on wet main steam 1, whose expansion starts from the saturation curve (quality 1.0), are equipped with moisture separator reheaters (MSR) Without MSRs 50 the HP exhaust steam 45 leaving the HP stage may contain up to 25% of water (quality less 75%) that is too damaging for operation because of the erosion and corrosion. The MSR 50 not only improves the turbine reliability (reduce the erosion of blades, housings, and diaphragms), but also improves efficiency of low pressure (LP) stage of steam turbine 40 as much as 2 to 4%.

Figure 2:
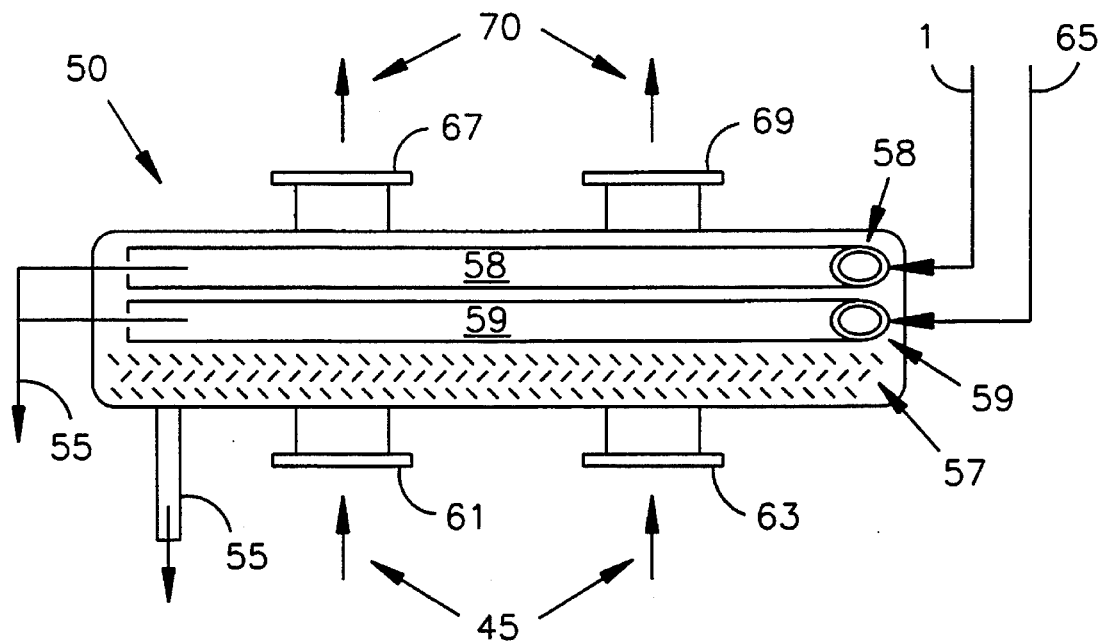
FIG. 2: Is a sectional view of a diagrammatic representation of the flow path in a MSR used in a typical nuclear electric generation plant.

The construction of the MSR 50 is not critical to the instant invention and is well known in the art. FIG. 2 illustrates the typical construction of a MSR 50. Now referring to FIG. 2, moisture 55 that is typically removed by chevron separating elements 57 from the HP exhaust steam 45 is returned to the feed system through a reheater 60. After the chevron separating elements 57 the HP exhaust steam, it is heated by at least one set of tube bundles. Most MSRs 50 in service today have two sets of tube bundles 58 and 59, and HP exhaust steam 45 enters on the bottom in dual portals 61 and 63, and exits the top of the MSR 50 through dual portals 67 and 69.

Once the moisture 55 is separated from the HP exhaust steam it is first heated by using extraction steam 65, then it is heated by main steam 1 with a set of tube bundles 59, and is then heated by tube bundle 58 that is supplied with main steam 1.

Extraction steam 65 is then directed from the MSR as MSR exhaust steam 70 and is then sent to the LP stage 40 of the main turbine 10, and is slightly superheated, and is typically from 85 to 185 psig. The MSRs 50 are extremely expensive, and are usually one-third the cost of the main turbine 10 itself, and is one of the most unreliable components in the entire generation system.

Figure 3:
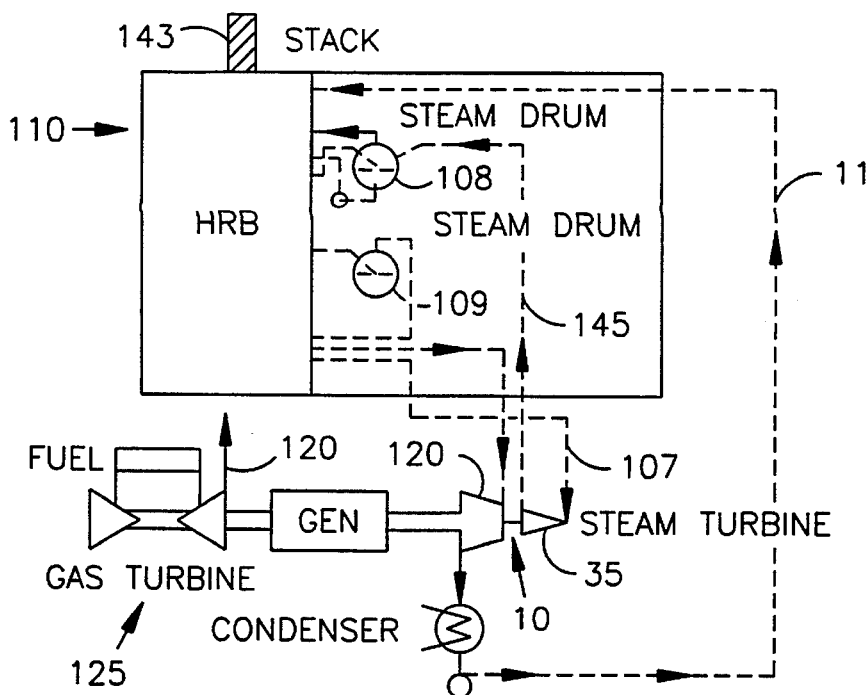
FIG. 3: Is a schematic representation of an HRB when used in a combined cycle power plant.

Also shown in FIG. 1 are other components that are typically found in light water nuclear reactor power generation systems. For example, turbine exhaust will proceed through the plenum 75 that connects the main turbine 10 and the condenser 80, to feed pump 85, to demineralizer 90, and then finally to pumping stages 95 and 100 before being returned to the steam generator 5. Nuclear-electric generating systems of this type typically have an efficiency of about 33 to 35% with a heat rate of about 10,000 Btu/kWh. Existing combined-cycle-electric plants currently utilize a heat recovery boiler 110 (HRB) to increase the efficiency. FIG. 3 illustrates how an HRB 110 would be utilized in a typical combined-cycle-electric plant.

ENHANCEMENT OF OPERATIONAL PERFORMANCE

Figure 4:
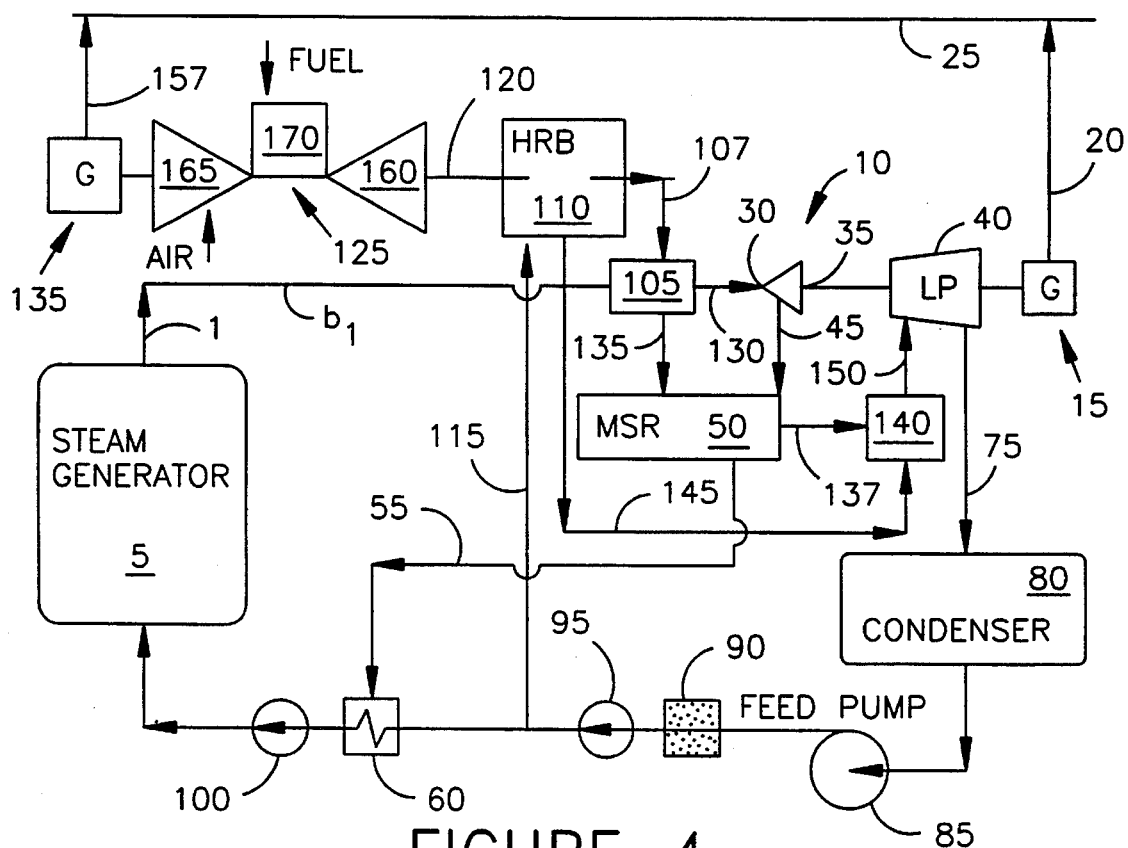
FIG. 4: Is a schematic representation of a typical nuclear reactor electric generation plant utilizing the invention to improve performance.

Now referring to FIG. 4, the overall plant schematic for a nuclear plant with the instant invention installed in the downstream portion of main steam piping 1 of the steam generator 5 is illustrated. It will become apparent how the instant invention improves the operational characteristics of HP inlet mixed steam 130 steam entering the entrance 30 to the HP Stage 35 and the LP stage 40 of the main turbine 10.

It should be noted in both FIGS. 1 and 4, main steam 1 denotes the main steam piping and the flow of main steam within that piping.

Main steam 1 from the steam generator 5 arrives at a high-pressure-mixer superheater (HPMS) 105 where it is superheated to the temperature from 570° to 680° F. by the high enthalpy-high pressure steam HRB outlet steam 107 from a heat recovery boiler (HRB) 110.

USE OF HRB IN CONVENTIONAL APPLICATIONS

Use of a HRB 110 in a conventional combined-cycle plant, is illustrated in FIG. 3 and is well known in the art. The cycle starts with water 115 that is returned to HRB 110 from the condenser 80 by the discharge of the feed pump 85 where it is heated by the exhaust 120 from a gas turbine 125. The fuel utilized by the gas turbine is not germane to the invention.

The exhaust gas 120 from the gas turbine 125 arrives to heat recovery boiler 110, where two pressures of steam are generated and then superheated. The high pressure and high enthalpy, HRB high pressure steam 107 is generated in high pressure loop 109; the HRB low pressure steam 145 is generated in low pressure loop 108. The construction of HRB 110 is not critical to the present invention and is well known in the art.

The gas turbine consists typically of several components: gas turbines 160, compressors 165, and burners 170. Operation of gas turbines is well known in the art. The gas turbine 125 is used to drive a generator 155 that supplies electricity 157 to the grid 25. This increases the overall plant efficiency to about 42 to 45% when the heat range is from 8200 to 7600 Btu/kWh.

USE OF HRB IN THE INSTANT INVENTION

Use of a conventional HRB 110 as described above is contemplated by the instant invention. However, the steam generated by the HRB will be used in a different manner.

The HRB high pressure steam 107 exits with high pressure (typically from 1000 to 1315 psig) and high temperature (typically from 830° to 935° F.), and is sent to High pressure mixer separator (HPMS) 105 to mix and to superheat main steam 1.

The HRB low pressure steam 145 exits with a pressure (typically from 80 to 200 psig) and high temperature (typically from 830° to 935° F.), and is sent to LPMS 140 to mix and superheat MSR discharge steam 137.

USE OF MSR IN CONJUNCTION WITH INSTANT INVENTION

Now referring to FIG. 6, the MSR 50 that is already installed in the plant can be used. The construction of the MSR 50 is not critical to the instant invention and is well known in the art. Moisture 55 that is removed from the HP exhaust steam 45 is returned to the feed system through a heater 60.

After the chevron separators 57 remove the moisture 55 from the HP exhaust steam 45, the HP exhaust steam 45 is reheated in the MSR 50 by using HPMS outlet steam 135 which is supplied by the HPMS 105. The exiting steam, now referred to as MSR discharge steam 137, is sent to the LPMS 140. In the LPMS 140 the MSR discharge steam 137 is superheated by HRB low pressure steam 145, that is supplied by the HRB 110. The resulting steam is high enthalpy low pressure steam, that is referred to as LPMS discharge steam 150. The LPMS discharge steam 150 is sent directly to the LP stage 40 of the main turbine 10. This treatment of HP exhaust steam 45 before entering the low pressure stage 40 of the main turbine 10 results in high quality steam in flow passes, reducing erosion of rotor blades and diaphragms and increasing efficiency from 3% to 5%.

GAS TURBINE AS A GENERATOR

Now referring again to FIG. 4, the gas turbine 125 is well known in the art as a reliable source of electrical energy. This enables the same turbine that is used to supply heated exhaust 120 to act as the source of electrical power 157 for use in emergency situations. This emergency power would be in addition to, or to supplement, the diesel generators that are typically installed in nuclear power stations.

Figure 5:
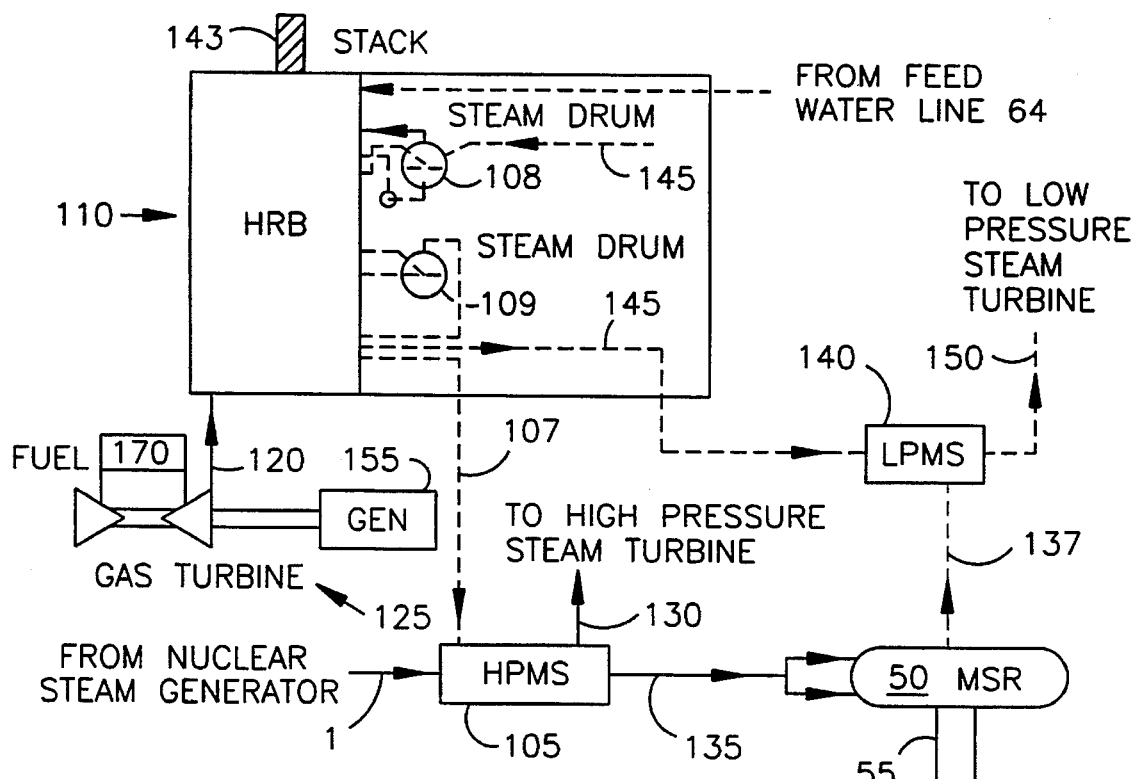

The gas turbine generator heat is the heat available in the exhaust 120. The amount of heat is only critical to the invention as long as it provides the sufficient energy to make the heat recovery boiler high pressure steam 107 has sufficient enthalpy to increase the operation characteristics of the steam at the turbine inlet 30 and to supply the needed energy to 140. Any energy available above this amount can be sent up the stack 143 as shown in FIG. 5. Therefore, the gas turbine generator can be used as an independent source of electrical power to the grid. This enables the dual use of a gas turbine electrical generator set. One use is to supply energy for the instant invention, and the other use is as an independent electrical energy source to supply electricity to the grid.

GRAPHICAL REPRESENTATION OF TYPICAL PLANT PERFORMANCE

The Mollier chart for the typical steam cycle of a typical light water reactor electric power generation system is illustrated in FIG. 9a.

Expansion in the HP stage of the Main Turbine ($a_1$–$a_2$)

Main steam 1 expands in the HP stage 30 of the main turbine until it exits as HP exhaust steam 45. This line on FIG. 9 represents a decrease in quality from about 1 to about 0.85, and is illustrated as going from point $a_1$ to point $a_2$.

Removal of Moisture from HP exiting wet steam in the MSR ($a_2$–$a_4$)

In the MSR 50 the moisture from HP exhaust steam 45 is first removed by chevron separating elements that increase the quality to about 0.94 that is graphically represented in FIG. 9 by the line from point $a_1$ to $a_2$.

Removal of Moisture from HP exiting wet steam in the MSR ($a_4$–$a_6$)

After the moisture is separated, the exhaust steam 45 is heated in two stages. The first is by extraction steam 65 and then by main steam 1. This removes all remaining moisture or superheats the HP exhaust steam 45 to point $a_5$ or $a_6$ depending upon the operational characteristics at in that plant at that time. The HP exhaust steam 45 is typically at a temperature of about 570° F. at this point.

Extraction of Work by LP stage of the Main Turbine ($a_6$–$a_7$)

Upon exiting the MSR 50 the MSR exhaust steam 70 feeds into the LP stage of the main turbine graphically shown as $a_6$ on FIG. 9a. Work is extracted in the LP stage that is graphically shown as going from $a_6$ to $a_7$, which is then directed to the condenser 80. The line representing the condenser is also indicated on FIG. 9a.

GRAPHICAL REPRESENTATION OF PLANT PERFORMANCE IMPROVED BY THE INSTANT INVENTION

The Mollier chart for the typical steam cycle of a light water reactor electrical generation station with instant invention installed is illustrated in FIG. 9b.

Enhancement of Main Steam ($b_1-b_3$)

Main steam 1 enters the inlet to the 105 main turbine as wet main steam 1 where it is superheated to point $b_3$ on FIG. 9b, where it exits as superheated HP inlet mixed steam 130.

Expansion in the HP stage of the Main Turbine ($b_1-a_2$)

As the superheated HP inlet mixed steam 130 expands in the HP stage of the main turbine work is extracted until it exits as HP exhaust steam 45 that is illustrated on FIG. 9b and represents a decrease in quality from superheated condition to about 0.94. On FIG. 9b this is illustrated as going from point $b_3$ to point $b_4$, and corresponds to going from $a_1$ to $a_2$ in a conventional plant.

Removal of Moisture from HP exiting wet steam in the MSR ($b_4-b_5$)

In the MSR 50 the moisture from HP exhaust steam 45 is first removed by chevron separating elements that increase the quality to about 1.0 that is graphically represented in FIG. 9 by the line from point $b_4$ to $b_5$.

Removal of Moisture from HP exiting wet steam in the MSR ($b_5-b_6$)

After the moisture is separated from the HP exhaust steam 45 it is heated in two stages. The first stage is the heating by High pressure mixer separator (HPMS) outlet steam 135 and the second stage is heating by main steam 1. This removes all remaining moisture or superheats the HP exhaust steam 45 to point $a_3$. The HP exhaust steam 45 is typically at a temperature of about 650° to 700° F. at this point.

Mixing and Reheating of MSR exiting wet steam in the LPMS ($b_6-b_8$)

After exiting the MSR 50 the MSR discharge steam 137 is mixed and reheated in the low pressure mixed separator (LPMS) 140 by HRB low pressure steam 145 where it is feed into the LP stage of the Main Turbine.

Extraction of Work by LP stage of the Main Turbine ($b_8-b_9$)

Work is being extracted in the LP stage and is represented by line $b_8$ to $b_9$ on FIG. 9b. The line representing the condenser is indicated on FIGS. 9a and 9b.

Elimination of the MSR

An additional advantage of the invention is elimination of the MSR. When the conditioning of the steam in going from $b_6$ to $b_8$ is greater than the conditioning that occurs in going from $b_4$ to $b_6$, the MSR is no longer necessary.

LP Stage utilizes Superheated Steam ($b_8$ to $b_8$)

Still another advantage of the invention is that the LPMS discharge steam 150 that is utilized by the LP stage 40 of the main turbine is superheated for a longer portion of travel through the LP stage 40, than that of the MSR exhaust steam 70. This reduces the erosion of the LP stage blades (not shown). Referring to FIG. 9a and FIG. 9b the distance from $b_8$ to $b_8$, is much larger than the distance from $a_6$ to $a_6$, each distance being a diagrammatic representation of the path of superheated steam within the LP stage of the main turbine.

REDUCTION OF CORROSION TO STEAM GENERATOR

The corrosion of secondary components in any nuclear power plant is temperature dependent. This dependence is illustrated in FIG. 7. The most detrimental aspect of corrosion in a nuclear power plant steam generator is tube failure due to corrosion. As illustrated in FIG. 7, with temperatures below 600° F., plugging versus years of operation only slightly increases. However, above 600° F. plugging increases dramatically.

Pressurized Water Reactors

Referring now to FIG. 8a, the instant invention enables a reduction in $T_{hot}$ 701, which is due to the lowering of the temperature differential, $T_{hot}-T_{cold}$ (701–702). For a given thermal output of the reactor 700, assuming that (1) the mass flow rate 705 in the primary cycle is held constant, and (2) that $T_{cold}$ 702 is held constant, as illustrated by the following equation:

$$Power_{reactor} = C_p * mass_{flowrate} * (T_{hot}-T_{cold}),$$

where $C_p$ is the specific heat of the primary system coolant.

Boiling Water Reactors

Referring now to FIG. 8b, the instant invention enables a reduction in $T_{hot}$ 801, which is due to the lowering of the temperature differential, $T_{hot}-T_{cold}$, (801–802) for a given thermal output of the reactor, assuming that (1) the mass flow rate in the primary system is held constant, and (2) that $T_{cold}$ is held constant, as illustrated by the previous equation, except where $C_p$ is the specific heat of the system coolant. The reactor 800 is a boiling water reactor, and $T_{hot}$ is considered to be the average temperature at the outlet of the reactor 800 and the inlet to the steam generator 5 which in a boiling water reactor is one unit. The thermal efficiency is higher; consequently for a lower value of $T_{hot}$ the same power level of the rated unit may be maintained. The reactor thermal power level can be reduced, the fuel cycle length can be extended, as well as a reduction in reactor vessel embrittlement.

SELECTION OF STEAM MIXING EQUIPMENT

Some of the individual components utilized in the instant invention contains the same type of equipment and materials found in many existing combined cycle plants, as well as some found in existing nuclear power plants. The physical construction of these components is not material to the instant invention.

There are many options for the selection of the mixer superheaters that are utilized in the instant invention in addition to the MSR's 50 discussed above. Specifically, the high pressure mixer superheater 105 and the low pressure mixer superheater 140.

FIG. 10 illustrates a bellows 1010 connection for a tube 120 injection of 107 through a nozzle 1030 into main steam 1 to form 130. The bellows arrangement 1010, or some other mechanism to allow for expansion and contraction, is necessary for all steam systems. Bellows arrangements 1010 typically have an upper hatch 1040 to allow for servicing. Typically an expanded portion of piping 1050 is installed to facilitate the insertion of the tube 1020.

FIG. 11 illustrates a honeycomb mixer placed in an expanded portion of pipe down stream of where 107 enters the main steam 1 flow. This type of mixer-superheater typically resembles a piping tee, with pipe 1110 being the vertical leg and the expanded section 1120, between the inlet 1130 and the outlet 1140 forming the horizontal leg.

FIG. 12 illustrates a vortex-vane mixer in which 107 and main steam 1 is fed into a series of vanes 1210 that induces a clockwise pattern, with the pipe and vane arrangement of FIG. 12, that causes 107 and 1 to mix. The resulting mixture, HP inlet mixed steam 130, is typically removed by pipe in the plane perpendicular to the plane of HRB high pressure steam 17 and main steam 1.

FUEL CYCLE AND ENRICHMENT EFFECTS

Still another advantage of the instant invention is to decrease the enrichment requirements of the reduced thermal power of nuclear reactors. The conversion from thermal energy to electrical energy is typically from 13–35% for plants without the instant invention and about 42–45% for plants with the invention.

Since the nuclear reactor thermal energy output is directly keyed to how much nuclear fuel is present in the reactor and at what fission rate it is operated at, less fissions will be required. Any given fuel assembly has so many fissions possible over the life of the plant therefore the life of the plant is extended.

The reduction in the requirement of thermal power allows for the reduction of fuel enrichment.

Efficiency Without the Instant Invention

Net efficiency for a nuclear plant without the invention can be expressed by the following equation:

$$\text{Efficiency} = v_{net} = \frac{\text{Plant Electrical Output}}{\text{Plant Thermal Output}} = \frac{MW_{E\text{-}gen}}{MW_{Rx}}$$

where $MW_{E\text{-}gen}$ is the total electrical output of the plant, and $MW_{Rx}$ is the total heat output of the reactor.

Efficiency With the Instant Invention

In a nuclear plant utilizing the instant invention, the net efficiency can be expressed by the following equation:

$$v_{net} = \frac{\text{Plant Electrical Output}}{Rx \text{ Thermal Output}} = \frac{MW_{E\text{-}gen} + MW_{E\text{-}tur}}{MW_{Rx} + MW_{tur\text{-}fuel}}$$

where $MW_{E\text{-}tur}$ is the output that the gas turbine generator 155 supplies to the grid, and $MW_{tur\text{-}fuel}$ is the energy release by the fuel in the burner 170 of the gas turbine 125. The increase in $v_{net}$ is due to both the powers added by the gas turbine generator and the lowering of the $MW_{Rx}$ for a given $MW_{E\text{-}gen}$. powers added by the gas turbine generator and the lowering of the $MW_{Rx}$ for a given $MW_{E\text{-}gen}$.

Since the nuclear reactor thermal output is directly keyed to how much nuclear fuel is present in the reactor and at what fission rate it is operated at, less fissions will be required. Any given fuel assembly has so many fissions possible over the life of the plant; therefore, the life of the plant is extended while maintaining the same amount of electrical power supplied to the grid.

Simulated computer runs on cost and efficiency have indicated that a 41.5% efficiency is possible when the instant invention is used on a 1260 $MW_e$ PWR plant with 3570 $MW_{th}$, which normally has an efficiency of $_{34}$%. In this computer simulation, $T_{hot}$ went from 615° F. to a $T_{hot}$ of 596.8° F.

OTHER EMBODIMENTS

There are many types of nuclear electrical generation plants now in operation. Each plant will have its individual operational requirements that can influence how the instant invention is applied to that particular system. The main factors that would influence the selection of the most applicable embodiment include but are not limited to: (1) steam pressure requirements; (2) steam temperature requirements; (3) steam quality requirements; (4) type of heat recover boiler (HRB) being used (i.e., does it have a plurality of steam discharge pressures); (5) maintenance condition of the equipment, for example is the moisture separator reheater need replacing; and (6) cost and availability of the equipment need to instant that particular embodiment.

Referring now to FIG. 13, an embodiment is illustrated that utilizes a heat recovery boiler that has only one steam pressure 107. This embodiment would use a second high pressure line 111 of the heat recovery boiler high pressure steam line 107. The second high pressure steam line 111 will require a pressure reduction device 112. In this embodiment the high pressure stage exhaust steam 45 is mixed with a second heat recovery boiler high pressure steam to form the low pressure mixer superheater discharge steam 150.

Referring now to FIG. 14, an embodiment is illustrated that utilizes a heat recovery boiler that has two steam pressures; i.e., the HRB high pressure steam 107 and the HRB low pressure steam 145. This embodiment would mix the HP exhaust steam 45 directly with HRB low pressure steam 145 to form the low pressure mixer superheater discharge steam.

Other Embodiments Possible

While several preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for improving the operational characteristics of a nuclear power electric generation plant that comprises the steps of:

(a) inserting into a downstream portion of main steam piping from a steam generator in said nuclear power plant a high pressure mixer superheater;

(b) supplying heat recovery boiler high pressure steam to said high pressure mixer superheater,
      (i) said heat recovery boiler high pressure steam being supplied from a heat recovery boiler, wherein said heat recovery boiler steam is mixed with said main steam causing said main steam to be superheated;
      (ii) said heat recovery boiler being heated by exhaust from a chemically fueled turbine;

(c) directing said superheated main steam into a high pressure stage of a main turbine of said nuclear power electric plant, wherein work is extracted by said high pressure stage of said main turbine;

(d) directing a high pressure exhaust steam into a low pressure mixer superheater where a heat recovery boiler low pressure steam is mixed with said high pressure exhaust steam wherein a low pressure mixer superheater discharge steam is formed that is further superheated;

(e) directing said low pressure mixer superheater discharge steam into a low pressure stage of the main turbine of said nuclear power electric generation plant; whereby efficiency of said nuclear power electric generation plant is increased.

2. A method for improving the operational characteristics of a nuclear power plant that comprises the steps of:

(a) inserting into a downstream portion of main steam piping from a steam generator in said nuclear power plant a high pressure mixer superheater;

(b) supplying heat recovery boiler high pressure steam to said high pressure mixer superheater;
      (i) said heat recovery boiler high pressure steam being supplied from a heat recovery boiler, wherein said heat recovery boiler steam is mixed with said main steam causing said main steam to be superheated;
      (ii) said heat recovery boiler being heated by exhaust from a chemically fueled turbine;

(c) directing said superheated main steam into a high pressure stage of a main turbine of said nuclear power electric plant, wherein work is extracted by said high pressure stage of said main turbine;

(d) directing a high pressure exhaust steam from said main turbine to a moisture separator reheater, said moisture separator reheater having at least one set of chevron moisture separators and at least one tube bundle, wherein said tube bundle is supplied with high pressure mixer separator steam, wherein said high pressure exhaust steam is superheated thereby forming a MSR discharge steam;

(e) directing said MSR discharge steam into a low pressure mixer superheater where a heat recovery boiler low pressure steam is mixed with said MSR discharge steam wherein a low pressure mixer superheater discharge steam is formed that is further superheated;

(f) directing said low pressure mixer superheater discharge steam into a low pressure stage of the main turbine of said nuclear power electric generation plant; whereby efficiency of said nuclear power electric generation plant is increased.

3. The method in claim 1, wherein said chemically fueled turbine drives a generator that supplies electricity.

4. The method in claim 1, wherein said chemically fueled turbine is a gas driven turbine.

5. The method in claim 1, wherein said chemically fueled turbine is a fossil fueled turbine.

6. The method in claim 1, wherein said electricity is supplied to the same grid as said nuclear power electric plant.

7. The method in claim 1, wherein high pressure stage exhaust steam is mixed with a second heat recovery boiler high pressure steam to form the low pressure mixer superheater discharge steam.

8. The method in claim 1, wherein high pressure stage exhaust steam is mixed with a second high pressure steam, after said second high pressure steam pressure is reduced by a pressure reduction device, to form the low pressure mixer superheater discharge steam.

9. An apparatus for improving the operational characteristics of a nuclear power electric generation having a steam generator that supplies main steam to a main turbine that drives an electrical generator, said main steam being directed to a condenser after the extraction of work where it is condensed, said condensate being returned to said steam generator by a feed pump, wherein the improvement comprises:

(a) a high pressure mixer superheater;

(b) a low pressure mixer superheater;

(c) a heat recovery boiler, producing a heat recovery boiler high pressure steam and a heat recovery boiler low pressure steam;

(d) a chemically fueled turbine generator, producing a heated exhaust for the heating of the heat recovery boiler high pressure steam and the heat recovery boiler low pressure steam;

(i) wherein the main steam is mixed with said heat recovery boiler high pressure steam, thereby being superheated before being directed to said main turbine;

(ii) wherein the exhaust from a high pressure stage of the main turbine is mixed with heat recovery boiler low pressure steam, thereby being superheated before being directed to the condenser;

(iii) whereby efficiency of said nuclear power electric generation plant is increased.

10. An apparatus for improving the operational characteristics of a nuclear power electric generation plant having a steam generator that supplies main steam to a main turbine that drives an electrical generator, and a moisture separator reheater to remove moisture and superheat said main steam before directing it to a low pressure stage of the main turbine for the extraction of work, after which it is directed to a condenser where it is condensed forming a condensate, said condensate being returned to said steam generator by a feed pump, wherein the improvement comprising:

(a) a high pressure mixer superheater;

(b) a low pressure mixer superheater;

(c) a heat recovery boiler producing a heat recovery boiler high pressure steam and a heat recovery boiler low pressure steam;

(d) a chemically fueled turbine generator, producing a heated exhaust, for the heating of the heat recovery boiler high pressure steam and the heat recovery boiler low pressure steam;

(i) wherein the main steam is mixed with said heat recovery boiler high pressure steam, thereby being superheated, before being directed to said main turbine;

(ii) wherein the exhaust from a high pressure stage is directed to said moisture separator reheater, thereby being superheated and moisture being removed;

(iii) wherein said exhaust from the moisture separator reheater is mixed with heat recovery boiler low pressure steam, thereby being superheated, before being directed to the condenser;

(iv) whereby efficiency of said nuclear power electric generation plant is increased.

11. The apparatus in claim 9, wherein said chemically fueled turbine drives a generator that supplies electricity.

12. The apparatus in claim 9, wherein said chemically fueled turbine is a gas driven turbine.

13. The apparatus in claim 9, wherein said chemically fueled turbine is a fossil fueled turbine.

14. The apparatus in claim 9, wherein high pressure stage exhaust steam is mixed with a second heat recovery boiler high pressure steam, after said second high pressure steam pressure is reduced by a pressure reduction device, to form a mixer superheater discharge steam.

15. The apparatus in claim 9, wherein high pressure stage exhaust steam is mixed with heat recovery boiler low pressure steam to form a low pressure mixer superheater discharge steam.

16. The apparatus in claim 11, wherein said electricity is supplied to the same grid as said nuclear power electric plant.

17. The apparatus in claim 16, wherein said electricity is used to supply plant emergency power requirements.

* * * * *